(12) United States Patent
Wegh et al.

(10) Patent No.: US 8,337,031 B2
(45) Date of Patent: Dec. 25, 2012

(54) COLOR-TUNABLE ILLUMINATION SYSTEM, LAMP AND LUMINAIRE

(75) Inventors: Rene Theodorus Wegh, Eindhoven (NL); Christoph Gerard August Hoelen, Eindhoven (NL); Chantal Sweegers, Eindhoven (NL); René Jan Hendriks, Eindhoven (NL); Martijn Henri Richard Lankhorst, Eindhoven (NL); Nicolas Gerardus Antonius Peeters, Eindhoven (NL); Martinus Petrus Joseph Peeters, Eindhoven (NL); Ramon Pascal Van Gorkom, Eindhoven (NL); Matthijs Hendrik Keuper, Eindhoven (NL); Coen Theodorus Hubertus Fransiscus Liedenbaum, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 268 days.

(21) Appl. No.: 12/602,192

(22) PCT Filed: May 5, 2008

(86) PCT No.: PCT/IB2008/051739
§ 371 (c)(1),
(2), (4) Date: Jun. 8, 2010

(87) PCT Pub. No.: WO2008/149250
PCT Pub. Date: Dec. 11, 2008

(65) Prior Publication Data
US 2010/0254115 A1    Oct. 7, 2010

(30) Foreign Application Priority Data
Jun. 4, 2007 (EP) .................................. 07109544

(51) Int. Cl.
*F21V 9/16* (2006.01)

(52) U.S. Cl. .......................................... 362/84; 362/248
(58) Field of Classification Search .................. 362/84, 362/248
See application file for complete search history.

(56) References Cited

U.S. PATENT DOCUMENTS

| 4,416,075 A | 11/1983 | Bauer |
| 5,749,646 A | 5/1998 | Brittell |

(Continued)

FOREIGN PATENT DOCUMENTS

| GB | 2288974 A | 11/1995 |

(Continued)

*Primary Examiner* — Evan Dzierzynski
(74) *Attorney, Agent, or Firm* — John F. Salazar; Mark L. Beloborodov

(57) ABSTRACT

The invention relates to a color-tunable illumination system (10), to a lamp and to a luminaire. The color-tunable illumination system comprises a light source (20) emitting light of a first predefined color (B), and comprises a luminescent material (30) for converting light of the first predefined color into light of a second predefined color (A). The color-tunable illumination system further comprises shielding means (40, 42) arranged for preventing at least part of the light emitted by the light source to impinge on the luminescent material. The light source, the luminescent material and/or the shielding means are changeable from a first situation to a second situation. In the first situation the color-tunable illumination system is arranged for shielding at least part of the luminescent material against impinging light of the first predefined color. In the second situation the color-tunable illumination system is arranged for shielding less of the luminescent material to the light of the first predefined color emitted by the light source compared to the first situation. The effect of the measures according to the invention is that the shielding means, luminescent material and/or the light source determine an amount of light of the second predefined color emitted by the color-tunable illumination system which determines a color of the color-tunable illumination system.

12 Claims, 12 Drawing Sheets

| U.S. PATENT DOCUMENTS | | | | FOREIGN PATENT DOCUMENTS | | |
|---|---|---|---|---|---|---|
| 6,357,889 B1 | 3/2002 | Duggal et al. | JP | 11025720 | | 1/1999 |
| 6,776,508 B2 | 8/2004 | Bucher et al. | JP | 11249607 | | 9/1999 |
| 6,802,635 B2 | 10/2004 | Robertson et al. | JP | 2007059260 | A | 3/2007 |
| 7,157,694 B2 | 1/2007 | May et al. | WO | 2005065356 | A2 | 7/2005 |
| 2005/0041424 A1 | 2/2005 | Ducharme | WO | 2005120135 | A1 | 12/2005 |
| 2005/0236958 A1 | 10/2005 | Wang et al. | WO | 2006087651 | A2 | 8/2006 |
| 2006/0258028 A1 | 11/2006 | Paolini et al. | WO | 2006133214 | A2 | 12/2006 |
| 2006/0268543 A1 | 11/2006 | Rains, Jr. | WO | 2007120582 | A1 | 10/2007 |
| 2007/0210326 A1 | 9/2007 | Kurihara | | | | |

COLOR-TUNABLE ILLUMINATION SYSTEM, LAMP AND LUMINAIRE

FIELD OF THE INVENTION

The invention relates to a color-tunable illumination system comprising a light source emitting light of a first predefined color and a first luminescent material for converting at least part of the light of the first predefined color into light of a second predefined color different from the first predefined color.

The invention also relates to a lamp and to a luminaire comprising the color-tunable illumination system. The invention also relates to a method of correcting for color-differences in the light emitted by a light source.

BACKGROUND OF THE INVENTION

Such illumination systems are known per se. They are used, inter alia, as luminaire for general lighting purposes, for example, for office lighting, for shop lighting or, for example, for in-home general lighting purposes.

The luminescent material generally absorbs part of the light emitted by a light source of the color-tunable illumination system and converts the absorbed light into light of a different color. The luminescent material is often arranged at a distance from the light source. This configuration is also referred to as a remote phosphor configuration. A benefit when using the remote phosphor configuration is that the conversion efficiency and the life-time of the luminescent material are improved and that the range of luminescent materials to choose from is improved.

Such a color-tunable illumination system is known from U.S. Pat. No. 6,357,889 in which a color tunable light source includes multiple light emitting components, such as light emitting diodes (also indicated as LEDs) or laser diodes (also indicated as LDs), with different emission wavelengths, and multiple phosphors with different excitation and emission wavelengths. The emission wavelengths of the different light emitting components are chosen to match the excitation wavelengths of the different phosphors. The light emitting components are powered by an electrical circuit which allows separate control of the optical power output of the different wavelength LEDs and/or LDs. The light from the light emitting components is arranged to impinge on the combination of phosphors such that the phosphors are excited and emit light at their characteristic wavelengths. By separately adjusting the power to each LED and/or LD, the amount of light emitted by each phosphor, and hence, through color mixing, the color of the light emitted is varied.

A disadvantage of the known color-tunable illumination system is that the known illumination system is relatively expensive.

SUMMARY OF THE INVENTION

It is an object of the invention to reduce a cost of the color-tunable illumination system.

According to a first aspect of the invention the object is achieved with a color-tunable illumination system according to claim 1. According to a second aspect of the invention, the object is achieved with a lamp as claimed in claim 13. According to a third aspect of the invention the object is achieved with a luminaire as claimed in claim 14. According to a fourth aspect of the invention the object is achieved with a method of correcting for color-differences in the light emitted by a light source. The color-tunable illumination system according to the invention comprises a light source, a first luminescent material, and shielding means, the light source emitting light of a first predefined color, the first luminescent material being arranged for converting light of the first predefined color into light of a second predefined color different from the first predefined color, and the shielding means being arranged for preventing at least part of the light emitted by the light source to impinge on the first luminescent material, the light source, the first luminescent material and/or the shielding means being changeable from a first situation to a second situation, in the first situation the light source, the first luminescent material and the shielding means being arranged for shielding at least part of the first luminescent material against impinging light of the first predefined color emitted by the light source, and in the second situation the light source, the first luminescent material and the shielding means being arranged for shielding less of the first luminescent material to the light of the first predefined color emitted by the light source compared to the first situation.

The effect of the color-tunable illumination system according to the invention is that the changing from the first situation to the second situation alters a contribution of the light of the second predefined color emitted by the first luminescent material to the light emitted by the color-tunable illumination system. This changing from the first situation to the second situation may be a gradual change in which substantially all intermediate steps alter the contribution of the light of the second predefined color. As a result of the altered contribution of the light of the second predefined color, the color of the light emitted by the color-tunable illumination system changes.

In the known color-tunable illumination system, the multiple light emitting components have different emission wavelengths which are chosen to match the excitation wavelengths of the different phosphors. By separately adjusting the power to each light emitting component the amount of light emitted by each phosphor is varied, and hence, the color of the light emitted is varied. Due to the changing of the power of the light emitting components for altering a color of the emitted light, the multiple light emitting components are not optimally used in the known color-tunable illumination system. Thus, the known color-tunable illumination system requires a surplus of light emitting components to obtain a color-tunable illumination system. Because generally the light emitting components are relatively expensive, the need for a surplus of light emitting components for altering a color results in relatively high costs of the known color-tunable illumination system. In the color-tunable illumination system according to the invention, the tuning of the color is generated by changing from the first situation to the second situation. This may, for example, be achieved by changing a position of the first luminescent material, and/or by changing a position of the light source, and/or by changing a position of the shielding means. No surplus of light sources is required to obtain color tunability in the color-tunable illumination system according to the invention which reduces a cost of the color-tunable illumination system according to the invention.

A further benefit of the color-tunable illumination system is that the tunability of the color-tunable illumination system may be used to correct the color of the light emitted by the light source. Generally, light sources, such as light emitting diodes are binned to select light emitting diodes that substantially emit the same color. This binning is relatively expensive. By adding the first luminescent material and shielding means which may be arranged between the light emitting diode and the first luminescent material, the color of the emitted light can be tuned to be substantially equal to the required color output, thus omitting the need for binning. This correction of the color of the light to correct for differences of the color emitted by the light source may also be done in the factory before selling the color-tunable illumination system. In such a system the color-tunable illumination system may be used to compensate for bin differences between light emitting diodes used as light source in the color-tunable illumination system. The tunability of the color emitted by the color-tunable illumination system may be used to ensure that the color emitted by the color-tunable illumination system substantially corresponds to a predetermined color, independent of the wavelength, flux and/or forward voltage bins of the light emitting diodes that are actually used to build the color-tunable illumination system. Such a system can omit the necessity of binning at all, i.e. any light emitting diode emitting light of a first predefined color can be used to obtain a color-tunable illumination system emitting a predetermined color.

In this context, light of a predefined color typically comprises light having a predefined spectrum. The predefined spectrum may, for example, comprise a primary color having a specific bandwidth around a predefined wavelength, or may, for example, comprise a plurality of primary colors. The predefined wavelength is a mean wavelength of a radiant power spectral distribution. In this context, light of a predefined color also includes non-visible light, such as ultraviolet light. The light of a primary color, for example, includes Red, Green, Blue, Yellow and Amber light. Light of the predefined color may also comprise mixtures of primary colors, such as Blue and Amber, or Blue, Yellow and Red. By choosing, for example, a specific combination of the Red, Green and Blue light substantially every color can be generated by the illumination system, including white. Also other combinations of primary colors may be used in the light projection system which enables the generation of substantially every color, for example, Red, Green, Blue, Cyan and Yellow. The number of primary colors used in the color-tunable illumination system may vary.

In an embodiment of the color-tunable illumination system, the shielding means being arranged between the light source and the first luminescent material, the shielding means being changeable from a first situation to a second situation, in the first situation the shielding means are arranged for substantially shielding the first luminescent material against impinging light of the first predefined color emitted by the light source, and in the second situation the shielding means are arranged for exposing at least part of the first luminescent material to the light of the first predefined color emitted by the light source. A benefit of this embodiment is that by only having the shielding means changeable between a first situation and a second situation results in a relatively simple construction of the color-tunable illumination system.

In an embodiment of the color-tunable illumination system, the shielding means, the first luminescent material and/or the light source are movable with respect to each other between the first situation and the second situation. The first situation relates, for example, to a first position of the shielding means relative to the first luminescent material in which the shielding means are substantially shielding the first luminescent material against impinging light of the first predefined color. The second situation relates, for example, to a second position of the shielding means relative to the first luminescent material in which at least part of the first luminescent material is exposed to the light of the first predefined color emitted by the light source. Alternatively the first luminescent material may move relative to the shielding means to generate the first position and the second position. Further alternatively, for example, the light source may be movable relative to the shielding means and/or the first luminescent material to obtain the first situation and the second situation. The part of the first luminescent material exposed to the light of the first predefined color converts at least part of the impinging light into light of the second predefined color which alters a color of the light emitted by the color-tunable illumination system according to the invention. A benefit of this embodiment is that a relatively simple and inexpensive mechanical arrangement may be used to change, for example, the position of the shielding means relative to the first luminescent material to tune the color of the light emitted from the color-tunable illumination system according to the invention. When choosing, for example, a specific position in-between the first and the second position of the shielding means relative to the first luminescent material, a specific area of the first luminescent material is exposed to light of the first predefined color which results in a specific color of the light emitted by the color-tunable illumination system according to the invention.

In an embodiment of the color-tunable illumination system, the shielding means comprises a second luminescent material for converting at least part of the light of the first predefined color into light of a third predefined color different from the first and second predefined color, the first luminescent material being unable to convert the light of the third predefined color into light of the second predefined color. The light converted by the second luminescent material cannot subsequently be used by the first luminescent material to be converted into light of the second predefined color. As such, the contribution of the second predefined color may be controlled, thus controlling the color emitted by the color-tunable illumination system. A benefit of this embodiment is that it may be relatively simple to produce. The shielding means constituted of a layer of the second luminescent material may, for example, be applied on a movable screen comprising the first luminescent material. By moving the movable screen the area of the first luminescent material illuminated by the light source and the area of the shielding means comprising the second luminescent material illuminated by the light source may be altered, thus altering the color emitted by the color-tunable illumination system in a very cost effective manner.

In an embodiment of the color-tunable illumination system, the shielding means are arranged for altering a transmission of the light of the first predefined color through the shielding means, the transmission of the light of the first predefined color being different in the first situation compared to the second situation. For example, the shielding means may comprise a liquid crystal cell to alter a transmission of the light of the first predefined color through the shielding means. A benefit of this embodiment is that, for example, an electronic drive signal from a control circuit to the liquid crystal cell may be used to alter a transmission of the shielding means to control a contribution of the light of the second predefined color to the light emitted by the color-tunable illumination system. The use of a liquid crystal cell may avoid the use of, for example, mechanical components which generally required maintenance and which generally require special arrangements such as motors to allow control of the position of the shielding means relative to the first luminescent material, and hence control the color of the color-tunable illumination system via an electronic drive signal.

In an embodiment of the color-tunable illumination system, the color tunable illumination system comprises a further luminescent material being arranged for converting light of the first predefined color into light of a further predefined color different from the first predefined color and the second predefined color. The further predefined color preferably is visible light, for example, white light. The light of the first predefined color, for example, may have a central wavelength in a range between 200 and 400 nanometers. Light in a range between 200 and 400 nanometers is also known as ultraviolet light. A benefit when using ultraviolet light as light of the first predefined color is that the color point of the light leaving the color-tunable illumination system is only determined by a mixture of phosphors in the luminescent materials arranged in the color-tunable illumination system because the light of the first predefined color does not contribute to the visible light. This as opposed to using blue light as light of the first predefined color, where the color point of the light leaving the color-tunable illumination system is also determined by total amount of luminescent materials present in the color-tunable illumination system since the total amount of the luminescent materials determines an extent of the conversion of the blue light. This means that, for example, the phosphor thickness when using blue light needs to be properly controlled, whereas this is not necessary for using ultraviolet light. The further predefined color may be substantially identical to the third predefined color.

In an embodiment of the color-tunable illumination system, the first luminescent material and the shielding means are arranged inside the light mixing chamber, and the light source is arranged for emitting light into the light mixing chamber. A benefit of this embodiment is that the use of the light mixing chamber generates substantially homogeneously mixed light emitted from the color-tunable illumination system which prevents the occurrence of colored shadows. The light of the first predefined color, for example, is blue light, and the light of the second predefined color, for example, is yellow light. Allowing light of the first predefined color to impinge on a part of the first luminescent material results in a conversion of a part of the impinging blue light into yellow. When mixed at a specific ratio inside the light mixing chamber, the light emitted from the light mixing chamber is substantially white light. When, for example, the area of the first luminescent material exposed to the light of the first predefined color is increased, a shift of the color of the light emitted by the light mixing chamber will occur, for example, reducing a color temperature of the light emitted by the color-tunable illumination system. Alternatively, when, for example, the area of the first luminescent material exposed to the light of the first predefined color is reduced, a shift of the color of the light emitted by the light mixing chamber will occur, for example, increasing the color temperature of the light emitted by the color-tunable illumination system.

In an embodiment of the color-tunable illumination system, the shielding means are movable inside the light mixing chamber, or wherein the shielding means are movable into or out of the light mixing chamber.

In an embodiment of the color-tunable illumination system, the first luminescent material is movable inside the light mixing chamber, or wherein the first luminescent material is movable into or out of the light mixing chamber. The first luminescent material may, for example, move behind the shielding means and as such the exposure of the first luminescent material to light of the first color is reduced, thus altering the color of the light emitted by the color-tunable illumination system. Alternatively, the first luminescent material may be applied on a movable screen which is moved into or out of the light mixing chamber. In such an embodiment, the walls of the light mixing chamber constitute the shielding means. By moving the screen out of the light mixing chamber, light of the first color cannot reach the first luminescent material which is moved out of the light mixing chamber because this light of the first color is blocked by the walls of the light mixing chamber.

In an embodiment of the color-tunable illumination system, the light mixing chamber comprises the further luminescent material, and wherein at least part of a surface of the shielding means facing the light source comprises the further luminescent material. A benefit of this embodiment is that substantially the whole interior surface in the light mixing chamber may be used to apply luminescent material. When the shielding means cover at least part of the first luminescent material, the side of the shielding means facing the light source comprises the further luminescent material which contributes to the light emitted by the color-tunable illumination system. Thus, the area of the first luminescent material which is covered by the shielding means is substantially replaced by the further luminescent material.

In an embodiment of the color-tunable illumination system, the first predefined color is within a ranged between 400 nanometers and 490 nanometers. Light having a central wavelength in a range between 400 and 490 nanometers is also known as blue light. A benefit when using blue light as light of the first predefined color is that this light is visible to humans and thus can directly be mixed into the output of the color-tunable illumination system without conversion. Any conversion using luminescent materials to convert light from one color to another introduces some loss of energy due to a Stokes-shift involved in the conversion. Using blue light as light of the first predefined color some of the light emitted by the color-tunable illumination system does not need to be converted which increases the efficiency of the system. Furthermore, the color blue is one of the primary colors which may be used to mix with other primary colors such as red and green or such as yellow to obtain white light. For example, when choosing the first luminescent material to absorb part of the blue light emitted by the light source and emit the second predefined color being the color yellow and the amount of first luminescent material is chosen properly so as to obtain the proper extent of conversion of light of the first predefined color, the light emitted from the color-tunable illumination system basically may, for example, be the color white (due to the combination of remainder of the blue light and yellow light emitted by the further luminescent material). By increasing a contribution of the light of the second predefined color to the light emitted by the color-tunable illumination system, for example, by increasing the area of the first luminescent material exposed to the blue light, the color temperature of the light emitted by the color-tunable illumination system is decreased. A further benefit when using blue light as light of the first predefined color is that the use of ultraviolet light in the color-tunable illumination system can be omitted which results in an omission of an additional UV-filter in the color-tunable illumination system. The UV-filter is typically required to prevent ultraviolet light from being emitted by the color-tunable illumination system. When the color-tunable illumination system is used in, for example, general lighting applications, the emission of ultraviolet light must be avoided because it is harmful to the human eye. Consequently, the color-tunable illumination system, for example, comprises a UV-filter which absorbs or reflects ultraviolet light to prevent emission of ultraviolet light. When using a light source which emit light of the color blue, the UV-filter may be omitted which again increases the efficiency of the system and which reduces the cost of the color-tunable illumination system.

In an embodiment of the color-tunable illumination system, the first luminescent material, the second luminescent material and/or the further luminescent material comprises a mixture of phosphor materials, wherein the mixture of phosphor materials in the first luminescent material is different from the mixture of the phosphor materials in the second and/or the further luminescent material. For example, in the embodiment in which the first predefined color is ultraviolet light, the further luminescent material, for example, is a mixture of phosphor materials emitting substantially white light having a first color temperature. The first luminescent material, for example, comprises a different mixture of phosphor materials emitting substantially white light having a second color temperature. By altering a contribution of the white light having the second color temperature to the white light having the first color temperature a shift in color temperature of the light emitted by the color-tunable illumination system is obtained. Alternatively, the further luminescent material comprises a mixture of phosphor materials emitting substantially white light and the first luminescent material comprises a phosphor material which emits, for example, light having the primary color red. For example, increasing a contribution of the light of the primary color red reduces the color temperature of the light emitted by the color-tunable illumination system. Alternatively, for example, the first luminescent material comprises a phosphor material which emits light having the primary color blue. For example, increasing a contribution of the light of the primary color blue increases the color temperature of the light emitted by the color-tunable illumination system.

In an embodiment of the color-tunable illumination system, the first predefined color is the color blue, the first luminescent material converts the absorbed light of the first predefined color into amber light being the second predefined color, and the second and/or further luminescent material convert the absorbed light of the first predefined color into yellow light being the further predefined color. A benefit of this embodiment is that using the first luminescent material emitting amber, the second and/or further luminescent material emitting yellow together with the first predefined color being blue, the color-tunable illumination system according to the invention can tune the color of the emitted light from relatively cold white to warm white, for example, between 6500K and 2700K substantially along the black-body locus. For example, the first luminescent material comprises a mixture of $Y_3Al_5O_{12}:Ce^{3+}$ and $CaS:Eu^{2+}$, and the further luminescent material (52) comprises $Y_3Al_5O_{12}:Ce^{3+}$. Alternatively, the first luminescent material comprises $(Ba,Sr)_2Si_5N_8:Eu^{2+}$, and the further luminescent material comprises $Y_3Al_5O_{12}:Ce^{3+}$. In a third embodiment, the first luminescent material comprises a mixture of $Lu_3Al_5O_{12}:Ce^{3+}$ and $CaS:Eu^{2+}$, and the further luminescent material comprises a mixture of $Lu_3Al_5O_{12}:Ce^{3+}$ and $CaS:Eu^{2+}$ with a different phosphor ratio. The first luminescent material may, for example, comprise a mixture of 85% w/w $Y_3Al_5O_{12}:Ce^{3+}$ (further also referred to as YAG:Ce) and 15% w/w $CaS:Eu^{2+}$, (further also referred to as CaS:Eu) which mixture emits the second predefined color amber. The first luminescent material may, for example, comprise $(Ba,Sr)_2Si_5N_8:Eu^{2+}$ (further also referred to as BSSN:Eu) which emits the second predefined color amber. The first luminescent material may, for example, comprise $Lu_3Al_5O_{12}:Ce^{3+}$ (further also referred to as LuAG:Ce) which emits the second predefined color green, and the first luminescent material may, for example, comprise $CaS:Eu^{2+}$ (further also referred to as CaS:Eu) which emits the second predefined color red. The embodiments using BSSN:Eu and YAG:Ce with blue light, and using two mixtures of LuAG:Ce and CaS:Eu with blue light can realize substantially the same effect. Other phosphors that convert blue light into red light, such as $(Ba,Sr,Ca)_2Si_5N_8:Eu^{2+}$, $(Sr,Ca)S:Eu^{2+}$, and $(Ca,Sr)AlSiN_3:Eu^{2+}$, can be used instead of CaS:Eu, reaching substantially the same effect. Other phosphors that convert blue light into green light, such as $Sr_2Si_2N_2O_2:Eu^{2+}$, and $SrGa_2S_4:Eu^{2+}$, can be used instead of LuAG:Ce, reaching substantially the same effect. The garnet luminescent materials YAG:Ce and LuAG:Ce can be replaced by $(Y_{3-x-y}Lu_xGd_y)(Al_{5-z}Si_z)(O_{12-z}N_z):Ce$ having $0<x\leq3$, $0\leq y\leq2.7$, $0<x+y\leq3$ and $0<z\leq2$.

Alternatively, using light sources emitting ultraviolet light, the first luminescent material and the second and/or further luminescent material comprises, for example, a mixture of $BaMgAl_{10}O_{17}:Eu^{2+}$ (converting ultraviolet light into blue light), $Ca_8Mg(SiO_4)_4Cl_2:Eu^{2+},Mn^{2+}$ (converting ultraviolet light into green light), and $Y_2O_3:Eu^{3+},Bi^{3+}$ (converting ultraviolet light into red light) with different phosphor ratios can enable a shift from relatively cold white to warm white, for example between 6500K and 2700K substantially along the black body locus. Any other color change is possible as well, determined by the phosphor ratio. Any other phosphor converting ultraviolet light into blue, green or red light or any other color can be used instead of the phosphors mentioned above.

BRIEF DESCRIPTION OF THE DRAWINGS

These and other aspects of the invention are apparent from and will be elucidated with reference to the embodiments described hereinafter.

In the drawings.

The figures are purely diagrammatic and not drawn to scale. Particularly for clarity, some dimensions are exaggerated strongly. Similar components in the figures are denoted by the same reference numerals as much as possible.

DETAILED DESCRIPTION OF EMBODIMENTS

Figure 1A:
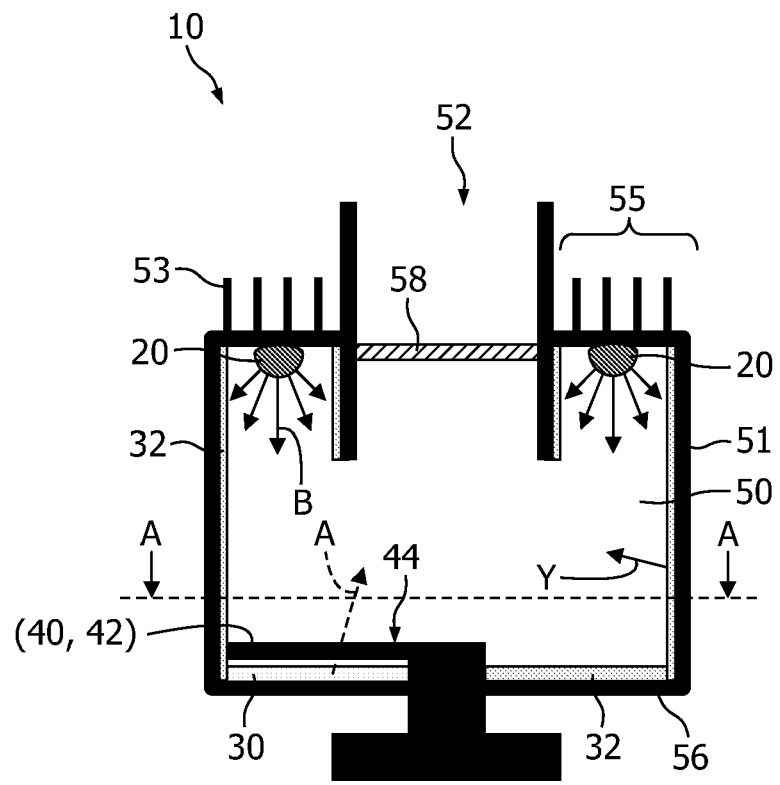
FIGS. 1A, 1B, 1C, and 1D show schematic cross-sectional views of a first embodiment of the color-tunable illumination system according to the invention.

FIGS. 1A, 1B, 1C, and 1D show schematic cross-sectional views of a first embodiment of the color-tunable illumination system 10 according to the invention. The color-tunable illumination system 10 according to the invention comprises a light source 20, a first luminescent material 30 and shielding means 40, 42, all arranged inside a light mixing chamber 50. The light source 20 may be any light source emitting light of a first predefined color B, for example, a light emitting diode 20, or a laser diode (not shown), or a discharge lamp (not shown) or an incandescent lamp (not shown). In the embodiment shown in FIG. 1A the light source 20 emits blue light B as light of the first predefined color B. The first luminescent material 30 is arranged for converting the light of the first predefined color B into light of the second predefined color A different from the first predefined color B. In the embodiment shown in FIG. 1A the first luminescent material 30 is applied to a bottom wall 56 of the light mixing chamber 50 opposite the light exit window 52 and covers substantially half of the inner surface of the bottom wall 56 of the light mixing chamber 50. The first luminescent material 30 is arranged for converting the blue light B emitted by the light source 20 into amber light A. The color-tunable illumination system 10 as shown in FIG. 1A further comprises a further luminescent material 32 for converting light of the first predefined color B into light of a further predefined color Y which is different from the light of the first predefined color B and from light of the second predefined color A. In the example of FIG. 1A the further luminescent material 32 is applied to the edge walls 51 and to the remainder of the inner surface of the bottom wall 56 of the light mixing chamber 50. The light of the further predefined color Y is substantially yellow light Y. When mixing the light of the first predefined color B with light of the further predefined color Y at a specific ratio, substantially white light can be generated and emitted from the light mixing chamber 50.

The color-tunable illumination system 10 further comprises shielding means 40, 42 which is arranged between the light source 20 and the first luminescent material 30. The shielding means 40, 42 according to the invention may, for example, be a mechanical shielding means 40 which are movable between a first position and a second position. Alternatively, the shielding means 42 may be a transmissive shielding means 42 which are able to alter a transmission for the light of the first predefined color B through the transmissive shielding means 42. The transmissive shielding means may, for example, be constituted of liquid crystal cells with crossed polarizers (not shown) to regulate the transmissivity of the light of the first predefined color B. In the embodiment shown in FIG. 1A the shielding means 40, 42 are changeable with respect to the first luminescent material 30 between a first situation (see FIG. 1B) and a second situation (see FIGS. 1C and 1D).

When the shielding means 40, 42 are movable mechanical shielding means 40, the first situation (see FIG. 1B) relates, for example, to a first position of the mechanical shielding means 40 relative to the first luminescent material 30 in which the mechanical shielding means 40 substantially cover the first luminescent material 30 and thus shield the first luminescent material 30 against impinging light of the first predefined color B. Because no light of the first predefined color B impinges on the first luminescent material 30, no light of the second predefined color A is emitted by the first luminescent material 30 and mixed with the light inside the light mixing chamber 50. The second situation relates, for example, to a second position of the movable mechanical shielding means 40 (shown in FIG. 1C) relative to the first luminescent material 30 in which at least part of the first luminescent material 30 is exposed to the light of the first predefined color B emitted by the light source 20. The area of the first luminescent material 30 exposed to the light of the first predefined color B determines an intensity of the light of the second predefined color A which is emitted by the first luminescent material 30 and which is mixed with the light inside the light mixing chamber 50. Mixing amber light A (being the light of the second predefined color A) with substantially white light mixed from the first predefined color B and the further predefined color Y increases the color-temperature of the white light and thus tunes the color of the light emitted from the color-tunable illumination system 10 according to the invention.

When the shielding means 40, 42 are transmissive shielding means 42, the first situation (see FIG. 1B) relates, for example, to a substantially opaque transmissive shielding means 42 substantially blocking the light of the first predefined color B to impinge on the first luminescent material 30. Because no light of the first predefined color B impinges on the first luminescent material 30, no light of the second predefined color A is emitted by the first luminescent material 30 and mixed with the light inside the light mixing chamber 50. The second situation (see FIG. 1D) relates, for example, to a transmissive shielding means 42 which transmits part of the light of the first predefined color B to impinge on the first luminescent material 30. The transmissivity of the transmissive shielding means 42 determines a contribution of the light of the second predefined color A in the light mixing chamber 50 and thus determines a color of the light emitted from the color-tunable illumination system 10. Mixing the amber light A (being the light of the second predefined color A) emitted by the first luminescent material 30 with substantially white light mixed from the first predefined color B (blue light) and the further predefined color Y (yellow light) results in increasing the color-temperature of the white light emitted from the color-tunable illumination system 10 according to the invention.

The first predefined color B, for example, is blue light B having a predefined wavelength in a range between 400 and 490 nanometers. This light of the first predefined color B is visible light to a human. Using, for example, YAG:Ce as further luminescent material 32 part of the impinging blue light B is converted into yellow light Y. By mixing the yellow light Y with the remainder of the blue light B, substantially "cool" white light can be mixed in the light mixing chamber 50 and subsequently emitted from the light mixing chamber 50. The amount of the further luminescent material 32 inside the light mixing chamber 50 determines the color temperature of the white light emitted from the light mixing chamber 50. The first luminescent material 30 may, for example, comprise a mixture of the phosphors YAG:Ce and CaS:Eu, wherein the YAG:Ce converts part of the impinging blue light into yellow light and wherein the CaS:Eu converts part of the impinging blue light into red light which are mixed inside the light mixing chamber 50. The combined emission of yellow light and red light results in amber light A to be emitted from the first luminescent material 30. By varying, for example, the weight percentages of the mixture of phosphors constituting the first luminescent material 30, the rate of change of the color temperature of the light emitted by the light mixing chamber 50 of the color-tunable illumination system 10 can be manipulated. Thus a specific range within which the color-tunable illumination system 10 can be tuned can be preset. The combination of YAG:Ce and CaS:Eu enables the range of the change of color of the color-tunable illumination system 10 to be near the black-body locus defined in the color-space. This embodiment is especially beneficial when using these color-tunable illumination systems 10 in luminaries used in general illumination applications, because the color variations may, for example, be tuned to closely resemble variations in white light, as in sunlight throughout a day from morning to evening. Alternatively, other phosphors and/or phosphor mixtures may be used to obtain a change of color of the color-tunable illumination system 10 according to the invention.

In a preferred embodiment of the color-tunable illumination system 10 according to the invention, the light source 20 comprises light emitting diodes 20. However, the light source 20 may be any suitable light source, such as an organic light emitting diode, a low-pressure discharge lamp, a high-pressure discharge lamp, an incandescent lamp or a laser light source. Furthermore, the color-tunable illumination system 10 may comprise additional light sources which may, for example, emit light of a different color to be mixed in the light mixing chamber 50.

In the embodiment of the color-tunable illumination system 10 as shown in FIG. 1A, the light source 20 is constituted of a plurality of light emitting diodes 20 which are arranged on an edge 55 of the light mixing chamber 50 next to the light exit window 52. The plurality of light emitting diodes 20 each emit light away from the light exit window 52 which prevents direct illumination of the light exit window 52 by the light emitting diodes 20. This arrangement of the light emitting diodes 20 reduces a glare of the color-tunable illumination system according to the invention. Glare results from excessive contrast between bright and dark areas in the field of view. Glare can, for example, result from directly viewing a filament of an unshielded or badly shielded light source. Especially when using the color-tunable illumination system 10 in a luminaire, direct view into the light source 20 by a human should be avoided to increase a visual comfort of the human. The light exit window 52 may further comprise a diffuser 58 to further enhance the mixing of the light emitted by the color-tunable illumination system 10 and to further reduce the glare. An additional benefit when the light emitting diodes 20 are arranged at the edge 55 of the light mixing chamber 50 is that the light emitting diodes 20 may be cooled without the use of active cooling arrangements such as fans (not shown) or Peltier elements (not shown). Generally, light emitting diodes 20 require some kind of cooling. When the light emitting diodes 20 are arranged on the edge 55 of the light mixing chamber 50 of the color-tunable illumination system 10 next to the light exit window 52, the cooling of the light emitting diodes 20 may be provided via cooling fins 53 arranged, for example, on the outside of a housing of the color-tunable illumination system 10. This enables the color-tunable illumination system 10 to be used as a luminaire and be built into, for example, a ceiling (not shown) of a house, office or shop, while cooling the light emitting diodes 20 via the cooling fins 53 protruding from the ceiling.

Figure 1B:
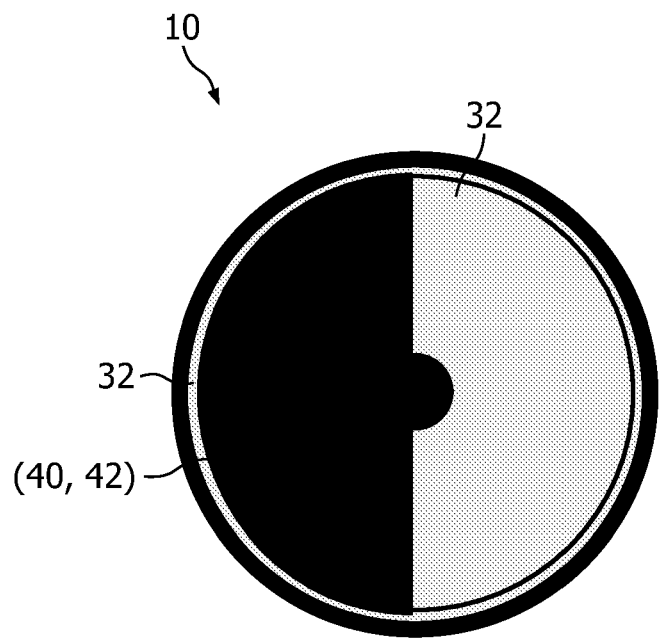

FIG. 1B shows a first cross-sectional view along the dashed line A-A of the color-tunable illumination system 10 shown in FIG. 1A. The embodiment shown in FIG. 1B represents the first situation in which the shielding means 40, 42 substantially shield the first luminescent material 30 (hidden from view in FIG. 1B by the shielding means 40, 42) against impinging light of the first predefined color B. The edge wall 51 and part of the inner surface of the bottom wall 56 of the light mixing chamber 50 are covered with the further luminescent material 32 which converts part of the impinging light of the first predefined color B into yellow light Y which, when mixed with the remainder of the blue light B results in white light.

Figure 1C:
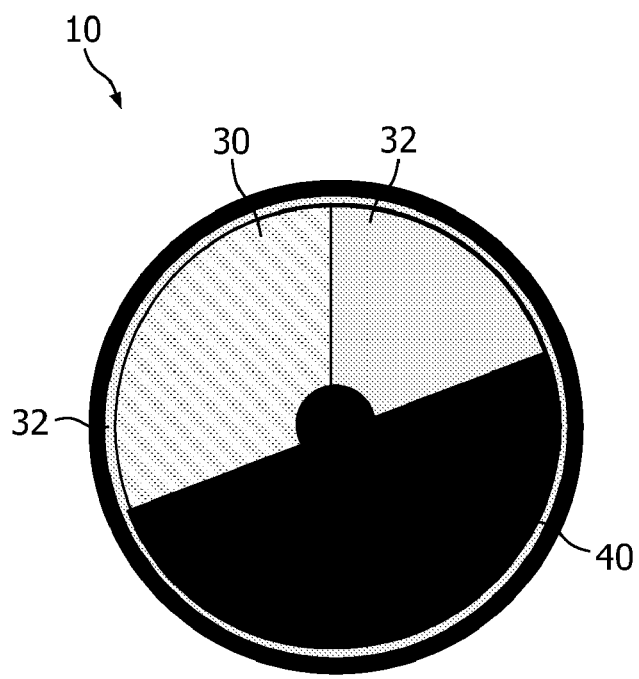

FIG. 1C shows a second cross-sectional view along the dashed line A-A of the color-tunable illumination system 10 shown in FIG. 1A. The embodiment shown in FIG. 1C represents the second situation for a movable mechanical shielding means 40 in which the mechanical shielding means 40 is rotated to expose part of the first luminescent material 30 to the light of the first predefined color B emitted by the light emitting diodes 20. The area exposed by the rotated mechanical shielding means 40 determines a contribution of the second predefined color A being amber light A, which in turn determines the increase in the color temperature of the white light. Further increasing the area of the first luminescent material 30 which is exposed to the light of the first primary color B will further increase the color temperature of the light emitted by the color-tunable illumination system 10 according to the invention.

Figure 1D:
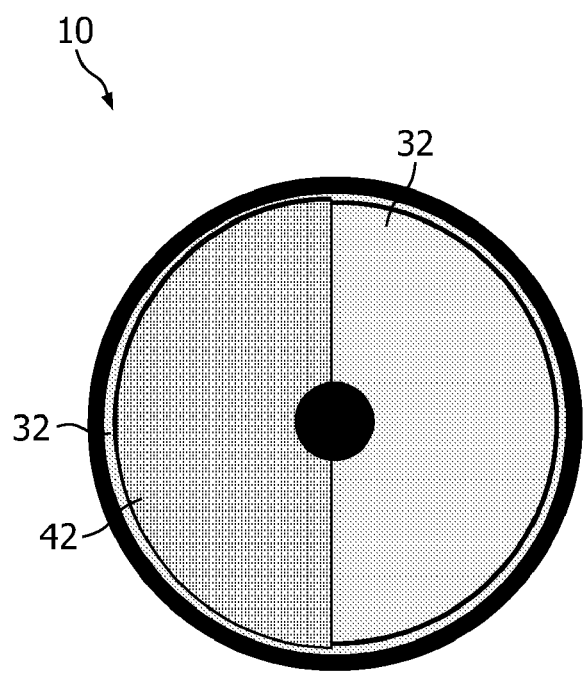

FIG. 1D shows a third cross-sectional view along the dashed line A-A of the color-tunable illumination system 10 as shown in FIG. 1A. The embodiment shown in FIG. 1D represents the second situation for a transmissive shielding means 42 which is arranged to be partially transmissive for the light of the first predefined color B. Thus part of the first luminescent material 30 is exposed to the light of the first predefined color B emitted by the light emitting diodes 20. The transmissivity of the transmissive shielding means 42 determines a contribution of the second predefined color A being amber light A, which in turn determines the increase in the color temperature of the white light. Further increasing the transmissivity of transmissive shielding means 42 increases the contribution of amber light A to the light mixed in the light mixing chamber 50 and thus further increase the color temperature of the light emitted by the color-tunable illumination system 10 according to the invention.

Figure 2A:
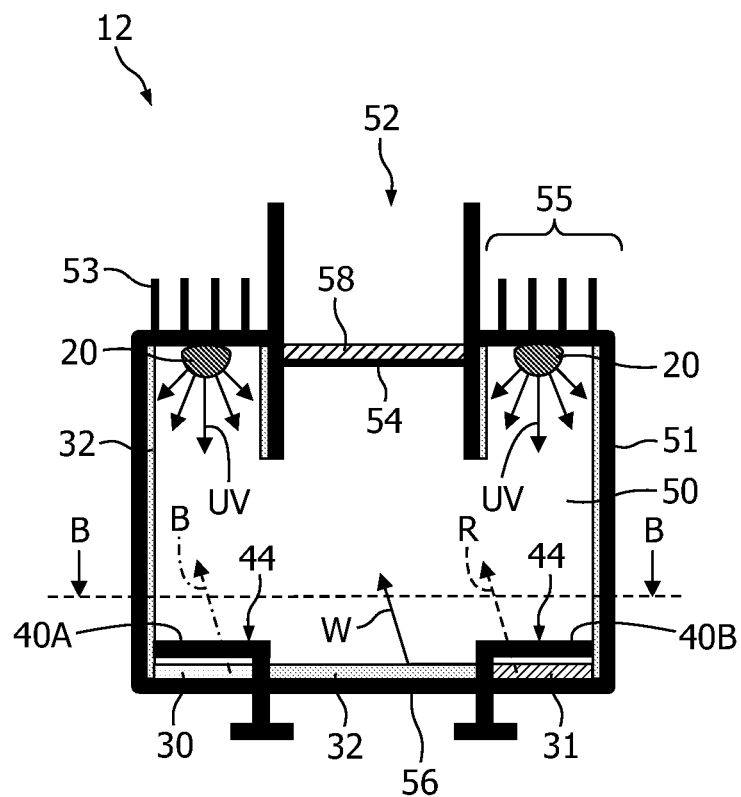
FIGS. 2A, 2B, 2C, 2D and 2E show schematic cross-sectional views of a second embodiment of the color-tunable illumination system according to the invention.

FIGS. 2A, 2B, 2C, 2D and 2E show schematic cross-sectional views of a second embodiment of the color-tunable illumination system 11 according to the invention. This second embodiment again comprises the plurality of light emitting diodes 20, the first luminescent material 30, the further luminescent material 32 and shielding means 40A, 40B arranged inside a light mixing chamber 50. In contrast to the embodiment shown in FIGS. 1A, 1B, 1C and 1D, the embodiments shown in FIGS. 2A, 2B, 2C, 2D and 2E comprise light emitting diodes 20 emitting light of the first predefined color UV being ultraviolet light UV, the further luminescent material 32 is arranged for converting part of the impinging ultraviolet light UV into substantially white light W, and the first luminescent material 30 is, for example, arranged for converting the ultraviolet light UV into light of the second predefined color B being blue light B. The first luminescent material 30 again is arranged at the bottom wall 56 of the light mixing chamber 50 covering a part of the inner surface of the bottom wall 56. The color-tunable illumination system 11 further comprises a third luminescent material 31 which is also applied to the bottom wall 56 of the light mixing chamber 50 which covers a further part of the inner surface of the bottom wall 56. The third luminescent material 31 is arranged for converting part of the impinging ultraviolet light UV into red light R. The remainder of the bottom wall 56 preferably comprises the further luminescent material 32 as shown in FIG. 2A. The shielding means 40A, 40B are constituted of a first shielding means 40A and a second shielding means 40B. The first shielding means 40A are movable mechanical shielding means 40A having substantially the same size as the first luminescent material 30 such that it may be able to fully cover the first luminescent material 30. The second shielding means 40B are movable mechanical shielding means 40B having substantially the same size as the third luminescent material 31 such that it may be able to fully cover the third luminescent material 31. Each one of the first shielding means 40A and the second shielding means 40B are movable between the first situation and the second situation. The first situation relates, for example, to a first position of the mechanical shielding means 40A, 40B relative to the first luminescent material 30 and the third luminescent material 31 (shown in FIG. 2B) in which the mechanical shielding means 40A, 40B substantially cover the first luminescent material 30 and the third luminescent material 31. The second situation relates, for example, to a second position of the mechanical shielding means 40A, 40B (shown in FIGS. 2C, 2D and 2E) relative to the first luminescent material 30 and/or the third luminescent material 31 in which at least part of the first luminescent material 30 and/or the third luminescent material 31 is exposed to the light of the first predefined color UV emitted by the light source 20. The area of the first luminescent material 30 exposed to the light of the first predefined color UV determines an intensity of the light of the second predefined color B which is emitted by the first luminescent material 30. Mixing blue light B with substantially white light W from the further predefined color W decreases the color-temperature of the white light W emitted from the color-tunable illumination system 10 according to the invention. The area of the third luminescent material 31 exposed to the light of the first predefined color UV determines an intensity of the red light R which is emitted by the third luminescent material 31. Mixing red light R with substantially white light W from the further predefined color W increases the color-temperature of the white light W emitted from the color-tunable illumination system 10 according to the invention.

The further luminescent material 32 is arranged for converting part of the impinging light of the first predefined color UV into, for example, substantially white light W. The further luminescent material 32 may, for example, comprise a mixture of different luminescent materials, such as a mixture of $BaMgAl_{10}O_{17}:Eu^{2+}$ (converting ultraviolet light into blue light), $Ca_8Mg(SiO_4)_4Cl_2:Eu^{2+},Mn^{2+}$ (converting ultraviolet light into green light), and $Y_2O_3:Eu^{3+},Bi^{3+}$ (converting ultraviolet light into red light). When choosing a specific ratio of the different luminescent materials, substantially white light W is emitted by the further luminescent material 32. The first luminescent material 30 may, for example, comprise $BaMgAl_{10}O_{17}:Eu^{2+}$ (converting ultraviolet light into blue light) and the third luminescent material 31 may, for example, comprise $Y_2O_3:Eu^{3+},Bi^{3+}$ (converting ultraviolet light into red light). Using the above mentioned phosphors enables the color-tunable illumination system 11 according to the invention to tune the white light W emitted from the light mixing chamber 50 from relatively "cold" white to relatively "warm" white, for example between 6500K and 2700K substantially along the black-body locus. Alternatively, other phosphors and/or phosphor mixtures may be used to obtain a change of color of the color-tunable illumination system 11 according to the invention.

The color-tunable illumination system 11 shown in FIG. 2A may further comprise an UV-filter 54 which, for example, reflects ultraviolet light UV back into the light mixing chamber 50. The UV-filter 54 may, for example, be a layer applied to the diffuser 58.

Figure 2B:
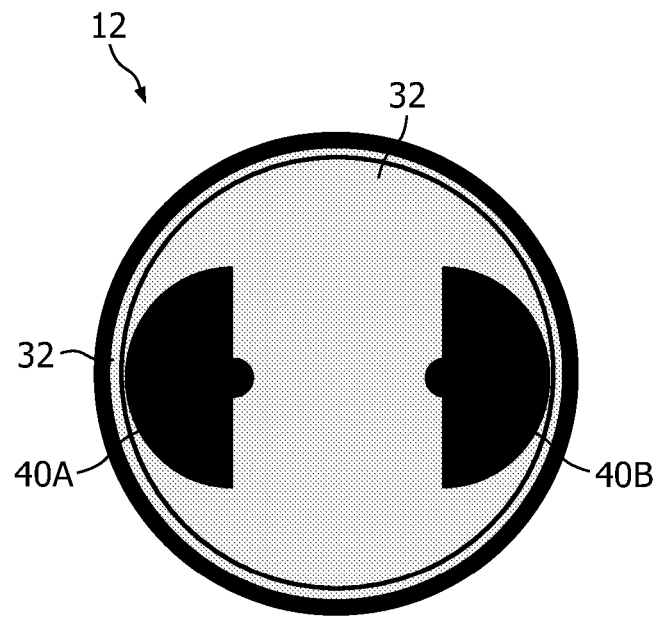

FIG. 2B shows a first cross-sectional view along the dashed line B-B of the color-tunable illumination system 11 shown in FIG. 2A. The embodiment shown in FIG. 2B represents the first position of the first shielding means 40A and the second shielding means 40B both substantially shielding the first luminescent material 30 and the third luminescent material 31 (hidden from view in FIG. 1B by the shielding means 40) against impinging light of the first predefined color UV. The edge wall 51 and part of the inner surface of the bottom wall 56 of the light mixing chamber 50 are covered with the further luminescent material 32 which converts the light of the first predefined color UV into substantially white light W.

Figure 2C:
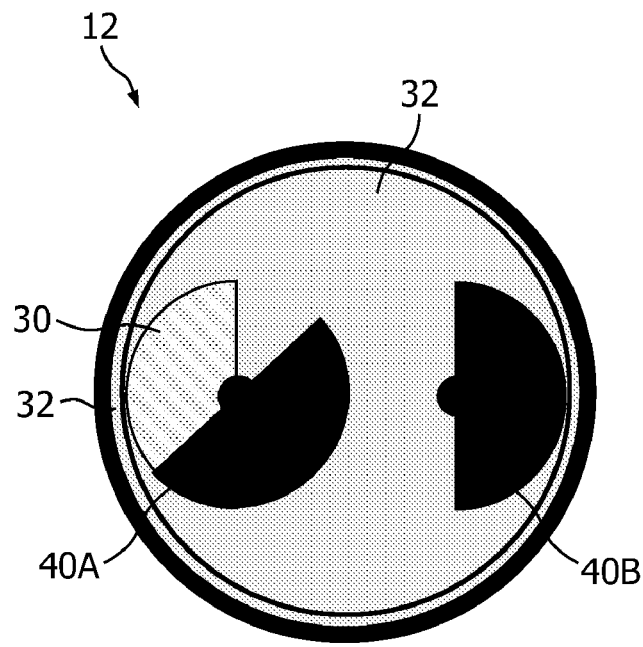

FIG. 2C shows a second cross-sectional view along the dashed line B-B of the color-tunable illumination system 11 shown in FIG. 2A. In the embodiment shown in FIG. 2C only the first shielding means 40A are rotated with respect to the first luminescent material 30, representing the second position of the first shielding means 40A exposing part of the first luminescent material 30 to the light of the first predefined color UV. In the current embodiment of the color-tunable illumination system 11 the first luminescent material 30 converts light of the first predefined color UV into blue light B. This blue light B mixes with the white light W emitted from the further luminescent material 32 and reduces a color temperature of the white light W emitted by the color-illumination system 11 according to the invention.

Figure 2D:
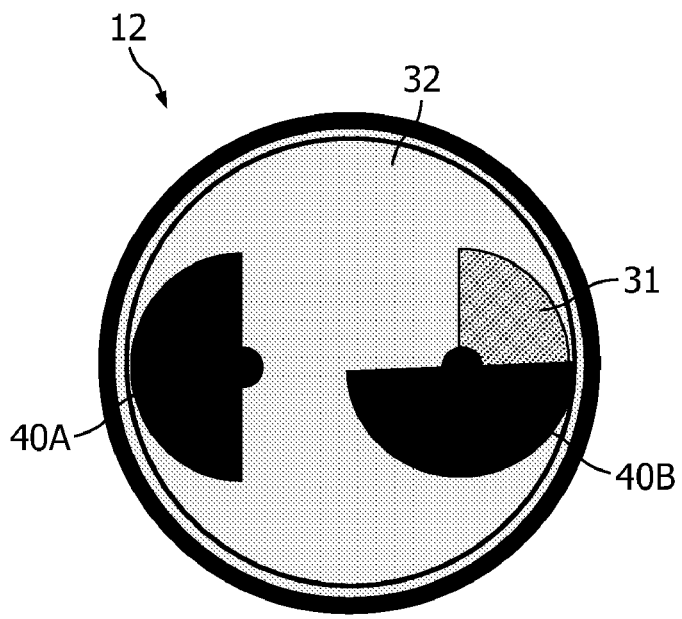

FIG. 2D shows a third cross-sectional view along the dashed line B-B of the color-tunable illumination system 11 shown in FIG. 2A. In the embodiment shown in FIG. 2D only the second shielding means 40B are rotated with respect to the third luminescent material 31, representing the second position of the second shielding means 40B exposing part of the third luminescent material 31 to the light of the first predefined color UV. In the current embodiment of the color-tunable illumination system 11 the third luminescent material 31 converts light of the first predefined color UV into red light R. This red light R mixes with the white light W emitted from the further luminescent material 32 and increases a color temperature of the white light W emitted by the color-tunable illumination system 11 according to the invention.

Figure 2E:
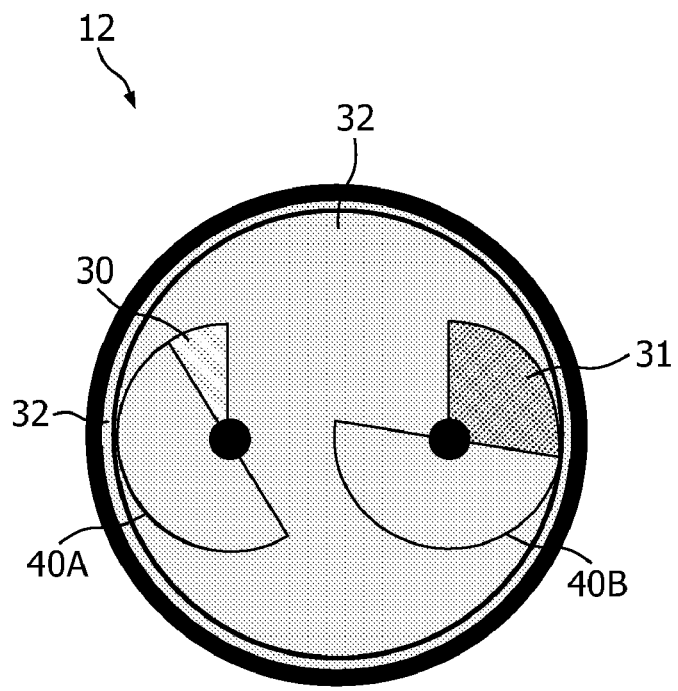

FIG. 2E shows a fourth cross-sectional view along the dashed line B-B of the color-tunable illumination system 11 shown in FIG. 2A. In the embodiment shown in FIG. 2E both the first shielding means 40A and the second shielding means 40B are rotated, exposing part of the first luminescent material 30 and of the third luminescent material 31, respectively, to the light of the first predefined color UV. Because the first shielding means 40A and the second shielding means 40B may be moved individually, the individual contributions of the blue light B and the red light R to the white light W of the further luminescent material 32 can be controlled, thus enabling an individual tuning of the color of the light emitted by the color-tunable illumination system 11 to both reduced color temperature and increased color temperature. In the embodiment of the color-tunable illumination system 11 as shown in FIG. 2E the surface 44 (see FIG. 2A) of the first shielding means 40A and the second shielding means 40B which faces the light source 20 is covered with further luminescent material 32. The further luminescent material 32 applied to the surface 44 will convert the light of the first predefined color UV impinging on the first shielding means 40A and on the second shielding means 40B into light of the further predefined color W which optimizes the efficiency of the conversion of the light of the first predefined color UV into the further predefined color W.

Figure 3A:
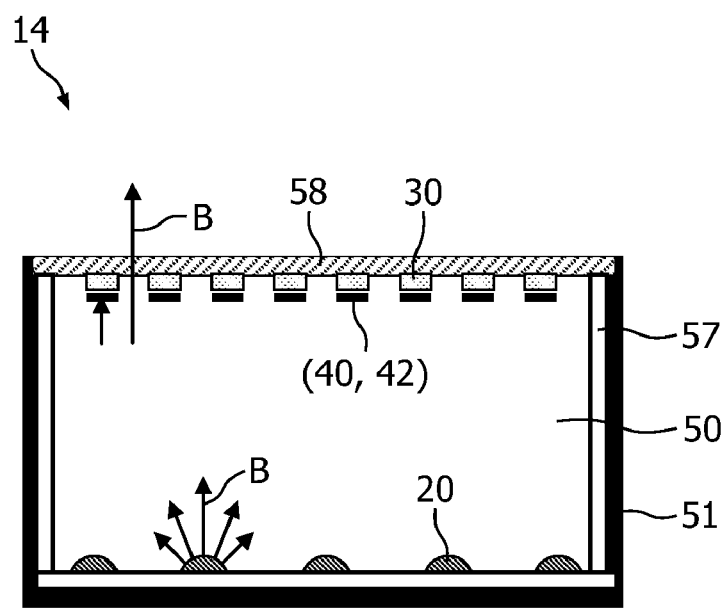
FIGS. 3A, 3B and 3C show schematic cross-sectional views of a third embodiment of the color-tunable illumination system according to the invention.
Figure 3B:
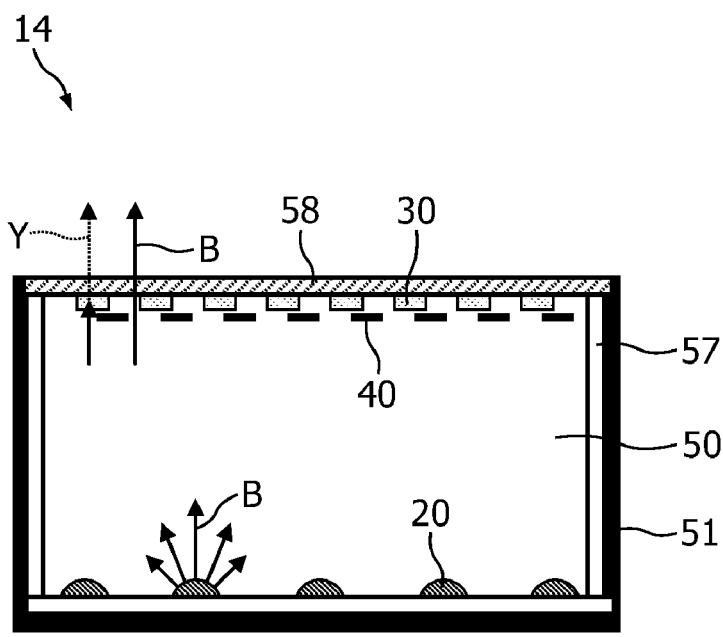
Figure 3C:
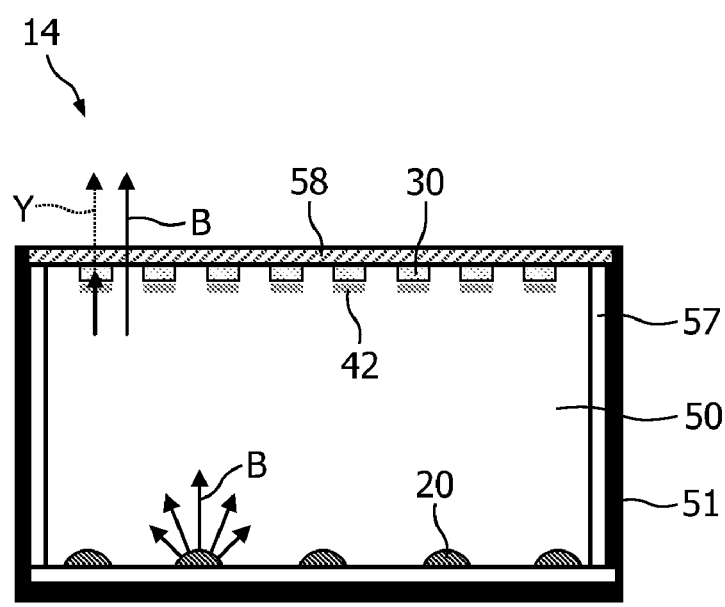

FIGS. 3A, 3B and 3C show schematic cross-sectional views of a third embodiment of the color-tunable illumination system 12 according to the invention. In this embodiment of the color-tunable illumination system 12 the light source 20 is constituted of a plurality of light emitting diodes 20 emitting light of the first predefined color B being blue light B. The color-tunable illumination system 12 further comprises a light mixing chamber 50 for mixing the light emitted by the plurality of light emitting diodes 20 to obtain a substantially homogeneous light output via the diffuser 58. The first luminescent material 30 is applied in a non-continuous layer 30 on the diffuser 58 and is arranged for converting the light of the first predefined color B into light of the second predefined color Y, being yellow light Y. The shielding means 40, 42 are arranged between the light emitting diodes 20 and the layer of first luminescent material 30 and are aligned with the first luminescent material 30 such that in the first situation (shown in FIG. 3A) the shielding means 40, 42 may substantially shield the first luminescent material 30 from light of the first predefined color B. In the second situation (shown in FIGS. 3B and 3C) the shielding means 40, 42 allow part of the light of the first predefined color B to impinge on the first luminescent material 30 such that part of the blue light B is converted to yellow light Y. The shielding means 40, 42 according to the invention may, for example, be mechanical shielding means 40 which are movable between the first position and the second position, and may be a transmissive shielding means 42 which are able to alter a transmission for the light of the first predefined color B through the transmissive shielding means 42. The edge walls 51 of the light mixing chamber 50 are covered with a diffusely reflecting layer 57 to further enhance the mixing of the light inside the light mixing chamber 50.

FIG. 3A represents the first situation in which the shielding means 40, 42 are arranged for substantially shielding the first luminescent material 30 from light of the first predefined color B. FIGS. 3B and 3C show different embodiments of the second situation in which the shielding means 40, 42 are arranged for exposing at least a part of the first luminescent material 30 to the light of the first predefined color B.

FIG. 3B shows the second situation in which the shielding means 40 are movable mechanical shielding means 40 which are moved with respect to the first luminescent material 30 to allow part of the light of the first predefined color B to impinge on the first luminescent material 30 and be converted by the first luminescent material 30 into light of the second predefined color Y. The area of the first luminescent material 30 exposed to the light of the first predefined color B determines an amount of the light of the second predefined color Y which is mixed with the light of the first predefined color B and determines a color of the light emitted by the color-tunable illumination system 12. The moving of the mechanical shielding means 40 may, for example, be a translational or a rotational movement. Alternatively, the mechanical shielding means 40 may be a segmented mechanical shielding means (not shown) such that the individual segments may be moved with respect to the first luminescent material 30 to determine the area of the first luminescent material 30 exposed to the light of the first predefined color B.

FIG. 3C shows the second situation in which the shielding means 42 are transmissive shielding means 42 in which a transmission of the light of the first predefined color B is altered such that part of the light of the first predefined color B impinges via the transmissive shielding means 42 on the first luminescent material 30. The transmission of the transmissive shielding means 42 determines a contribution of the light of the second predefined color Y to the light of the first predefined color B, and thus determines a color of the light emitted by the color-tunable illumination system 12 according to the invention.

FIGS. 4A, 4B, 4C and 4D show schematic cross-sectional views of a fourth embodiment of the color-tunable illumination system 13 according to the invention. In this embodiment of the color-tunable illumination system 13 the light source 20 comprises a plurality of light emitting diodes 20 emitting light of the first predefined color UV, for example, being UV light UV. The color-tunable illumination system 13 optionally comprises cooling means 60 for cooling the light sources 20 which preferably are light emitting diodes 20 or laser diodes 20. The color-tunable illumination system 13 further comprises a light mixing chamber 50 for mixing the light emitted by the plurality of light emitting diodes 20 to obtain a substantially homogeneous light output. The first luminescent material 30 is applied on a movable sheet 70 and is arranged for converting the light of the first predefined color UV into light of the second predefined color Y, being, for example, yellow light Y. The movable sheet 70 may be moved into the light mixing chamber 50 and out of the light mixing chamber 50 such that in the first situation part of the movable sheet 70 is partially outside the light mixing chamber 50 and thus part of the first luminescent material 30 is shielded from light of the first predefined color UV by the bottom wall 56 of the light mixing chamber 50. Thus, the walls of the light mixing chamber 50 function as the shielding means 40 for shielding part of the first luminescent material 30 from the impinging light of the first predefined color UV. In the embodiment shown in FIG. 4A a further luminescent material 32 is arranged at the light exit window 52 of the color-tunable illumination system 13, and a third luminescent material 31 is arranged on a further movable sheet 71 which may be movable, for example, independently from the movable sheet 70. The further luminescent material 32, for example, converts light of the first primary color UV into white light W and the third luminescent material 31, for example, converts light of the first predefined color UV, for example, into light of the color red R. Again the further movable sheet 71 may be moved into the light mixing chamber 50 and out of the light mixing chamber 50 such that the contribution of the red light R emitted by the third luminescent material 31 after absorbing light of the first predefined color UV can be controlled. The color-tunable illumination system 13 further comprises a diffusely reflecting layer 57 for enhancing the mixing of the light inside the light mixing chamber 50. Alternatively, the light mixing chamber may comprise a diffuser 58 (see FIG. 3). By moving the movable sheet 70 and/or the further movable sheet 71 independently into and out of the light mixing chamber 50 the color of the light emitted by the color-tunable illumination system 13 can be controlled. Of course, alternatively, the light of the first predefined color B may be blue light B as indicated in previous embodiments.

Figure 4A:
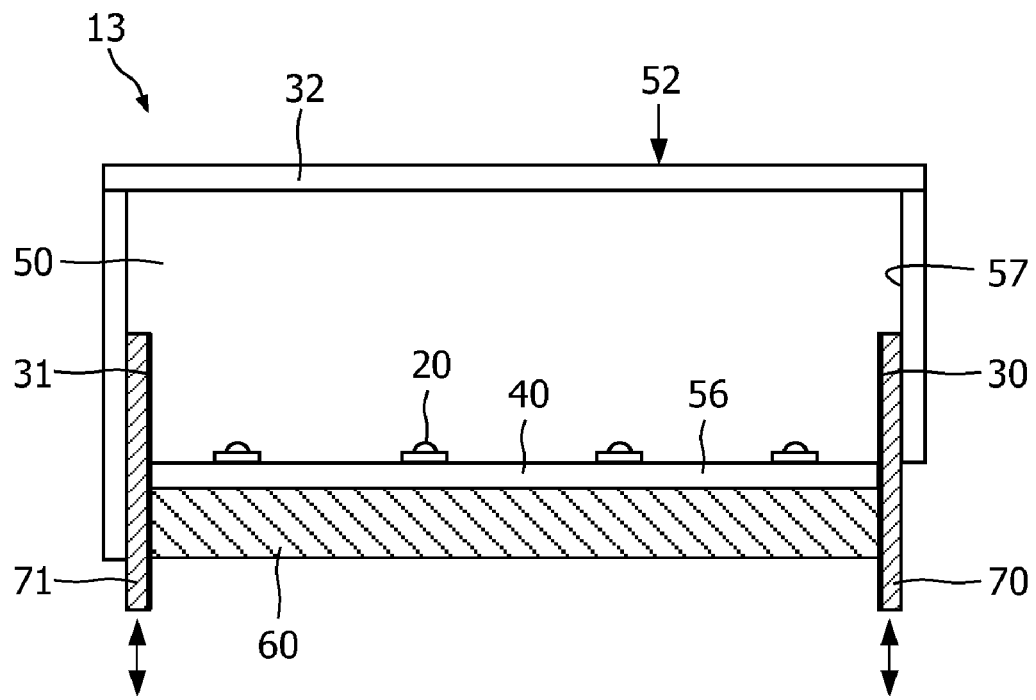
FIGS. 4A, 4B, 4C and 4D show schematic cross-sectional views of a fourth embodiment of the color-tunable illumination system according to the invention.
Figure 4B:
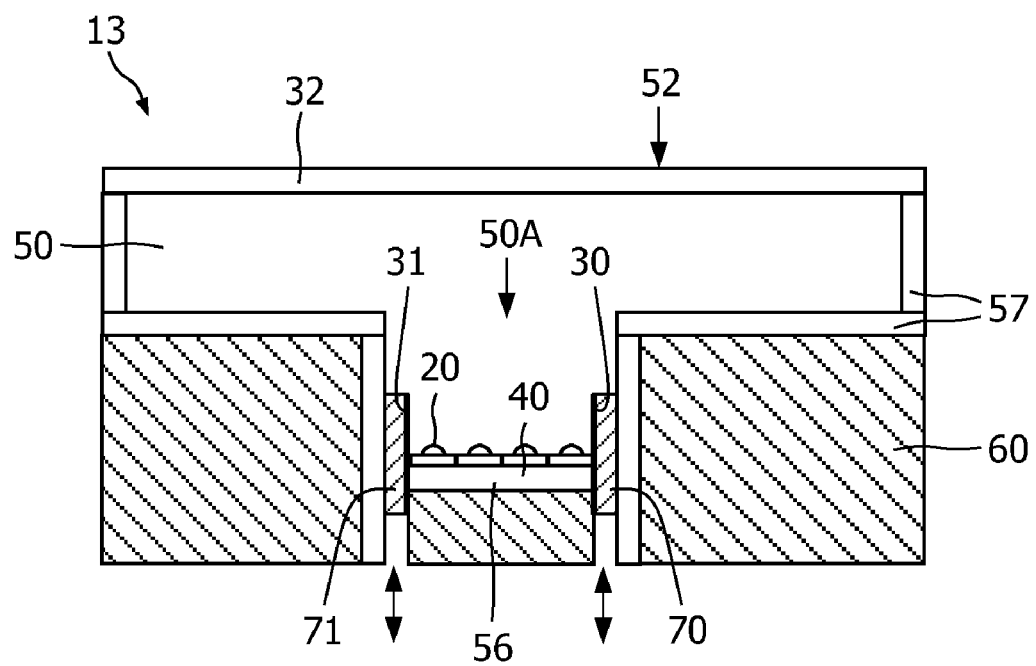

In the embodiment shown in FIG. 4B the light source 20, the movable sheet 70 and the further movable sheet 71 are arranged in a part 50A of the light mixing chamber 50 to enhance the conversion efficiency of the first luminescent material 30 and the third luminescent material 31. Because the distance between the light source 20 and the first luminescent material 30 and between the light source 20 and the third luminescent material 31 is relatively small, a larger part of the light emitted by the light source 20 will impinge on the first luminescent material 30 and/or the third luminescent material 31 to be converted. This arrangement will enhance the uniformity of the light across the light exit window 52 as the remainder of the light mixing chamber 50 is used to mix the light emitted by the light source 20, by the first luminescent material 30 and by the third luminescent material 31.

Figure 4C:
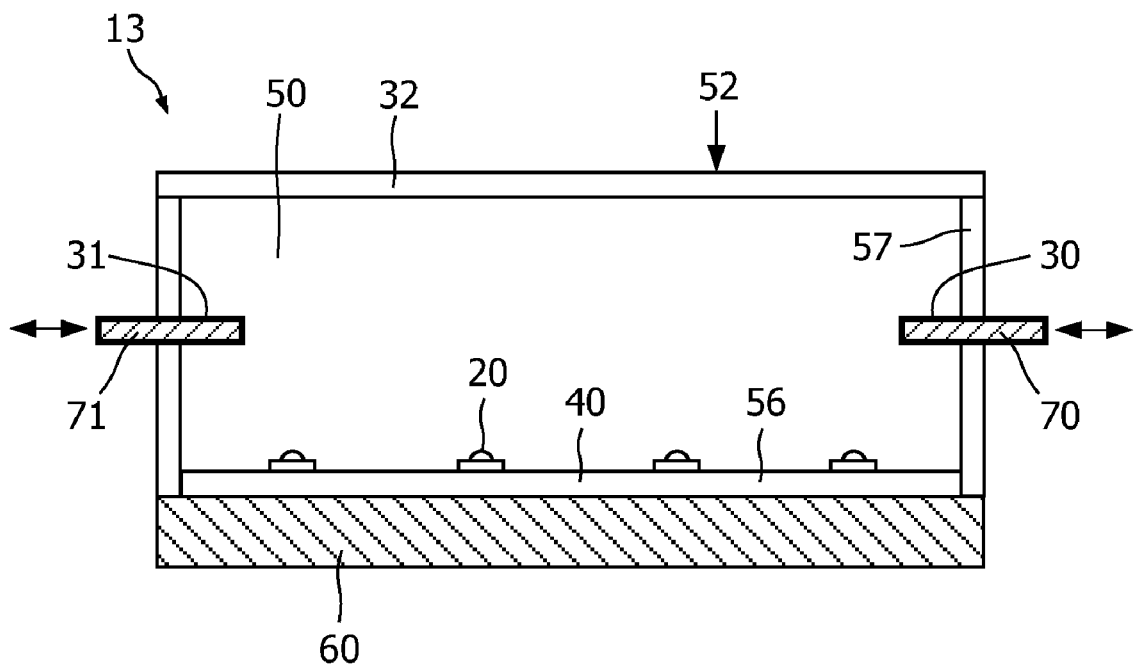

In the embodiment shown in FIG. 4C the movable sheet 70 and the further movable sheet 71 are located only at an edge of the light mixing chamber 50. This arrangement of the movable sheet 70 and of the further movable sheet 71 enhances the conversion efficiency of the nearby light sources 20 as the movable sheet 70 and the further movable sheet 71 may shield part of the light emitted by the nearby light sources 20 from direct impinging on the further luminescent material 32. As such, light is captured between the movable sheet 70 and the bottom wall 56 which enhances the conversion efficiency.

Figure 4D:
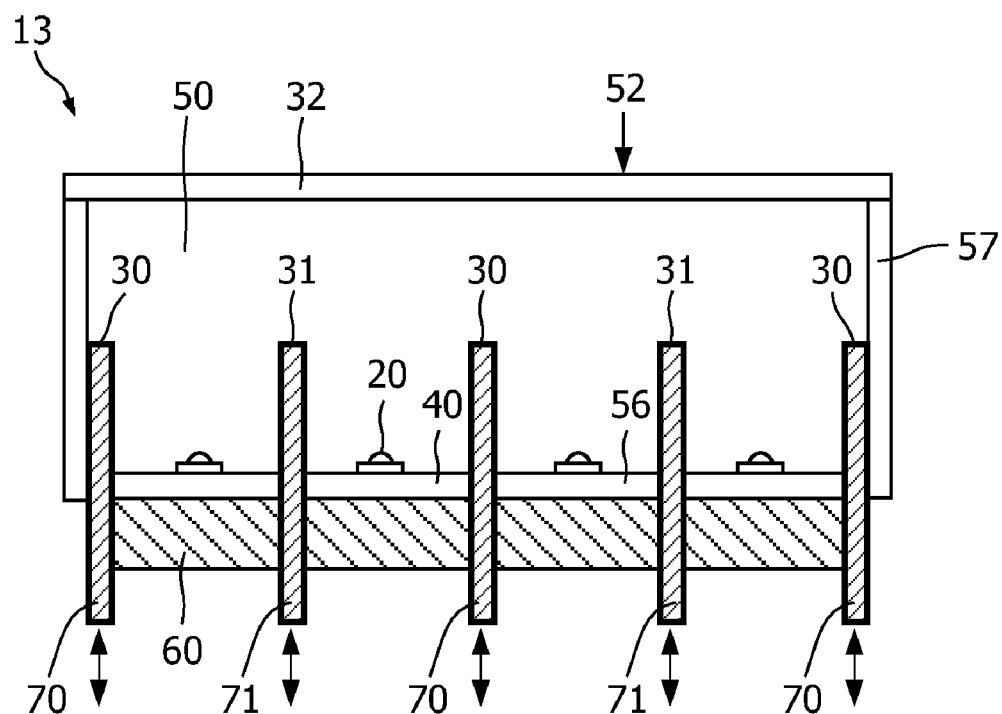

In the embodiment shown in FIG. 4D the color-tunable illumination system 13 comprises a plurality of movable sheets and the further movable sheets 71 which are arranged between the light sources 20. In such an embodiment, the individual movable sheets 70 and further movable sheets 71 may be controlled individually, to individually control the color conversion of each of the light sources 20. Furthermore, the distribution of the movable sheets 70 and the further movable sheets 71 are better distributed within the light mixing chamber 50 which further enhances the uniformity of the light emitted by the light exit window 52 via the further luminescent material 32. Alternatively, the further luminescent material 32 may comprise a diffusing sheet 58 (see FIG. 3).

Figure 5A:
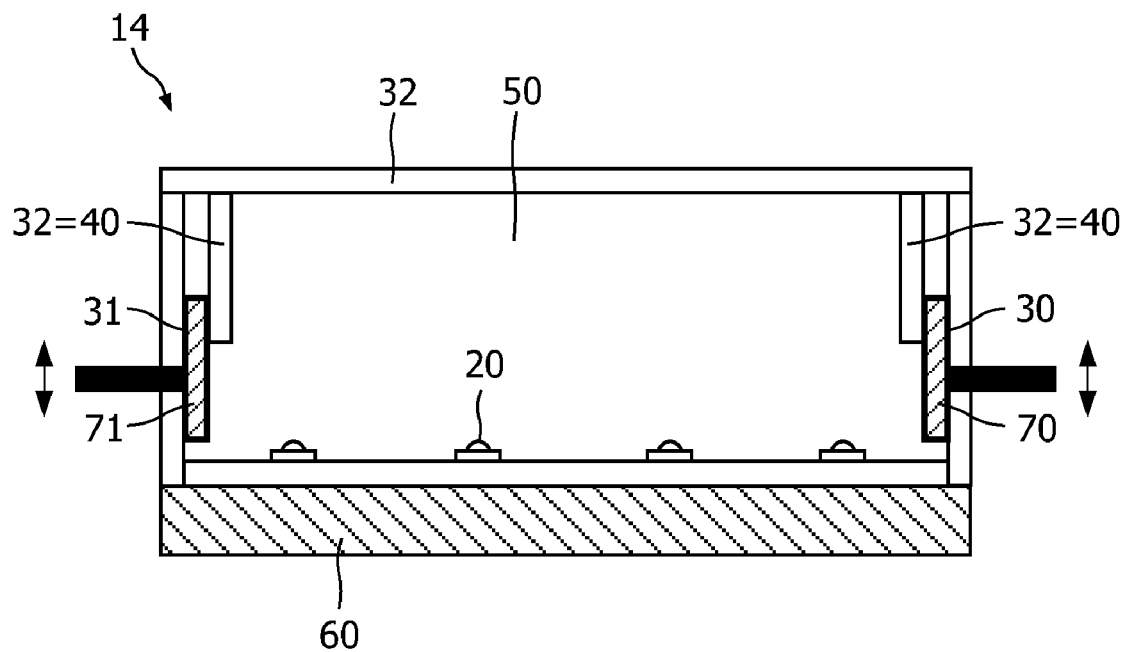
FIGS. 5A and 5B show schematic cross-sectional views of a fifth embodiment of the color-tunable illumination system according to the invention.
Figure 5B:
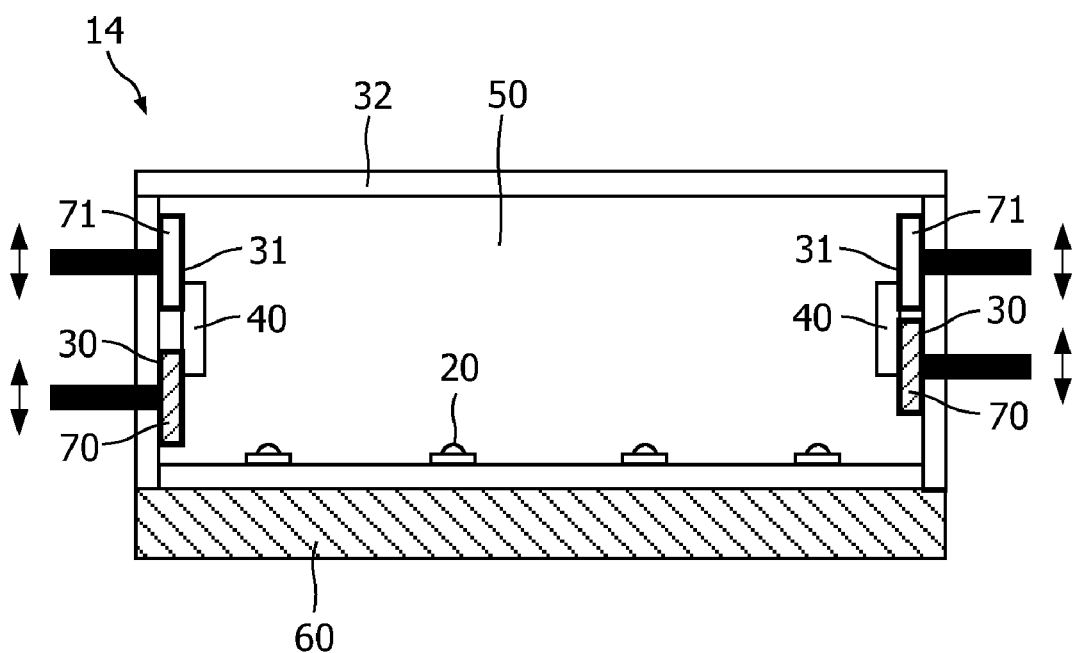

FIGS. 5A and 5B show schematic cross-sectional views of a fifth embodiment of the color-tunable illumination system 14 according to the invention. In this fifth embodiment of the color-tunable illumination system 14, the movable sheet 70 and the further movable sheet 71 are arranged to move behind a shielding means 40 comprising the further luminescent material 32.

In the embodiment shown in FIG. 5A the movable sheet 70 comprises the first luminescent material 30 and the further movable sheet 71 comprises the third luminescent material 31, each arranged at an opposite side of the light mixing chamber 50. By individually moving the movable sheet 70 and the further movable sheet 71 the color of the color-tunable illumination system 14 may be tuned.

In the embodiment shown in FIG. 5B each of the sides of the light mixing chambers 50 comprise a movable sheet 70 and a further movable sheet 71. In such an embodiment the light emitting first luminescent material 30 and the third luminescent material 31 is more evenly spread within the light mixing chamber 50 which improves the uniformity of the light emitted by the color-tunable illumination system 14.

Figure 6A:
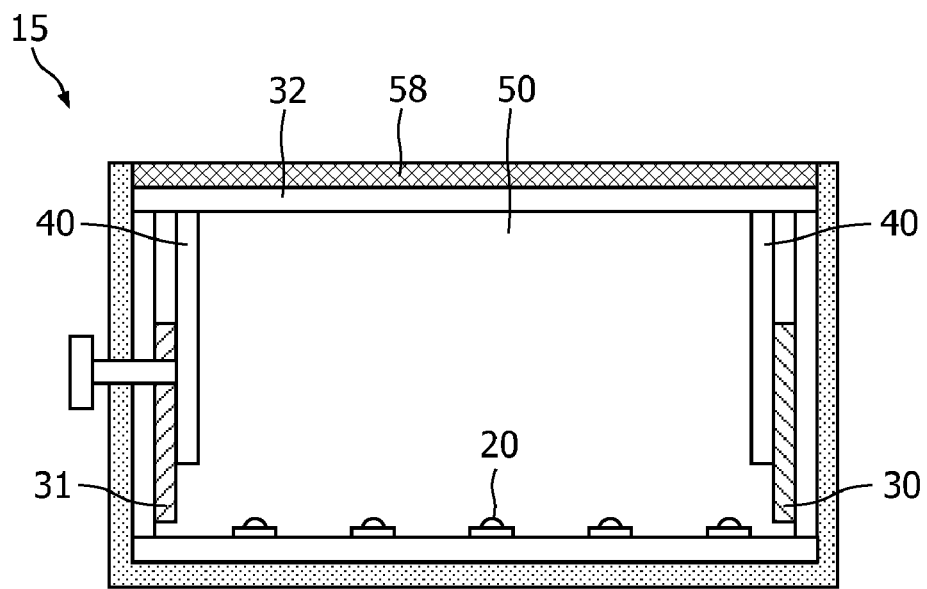
FIGS. 6A and 6B show schematic cross-sectional views of a sixth embodiment of the color-tunable illumination system according to the invention.
Figure 6B:
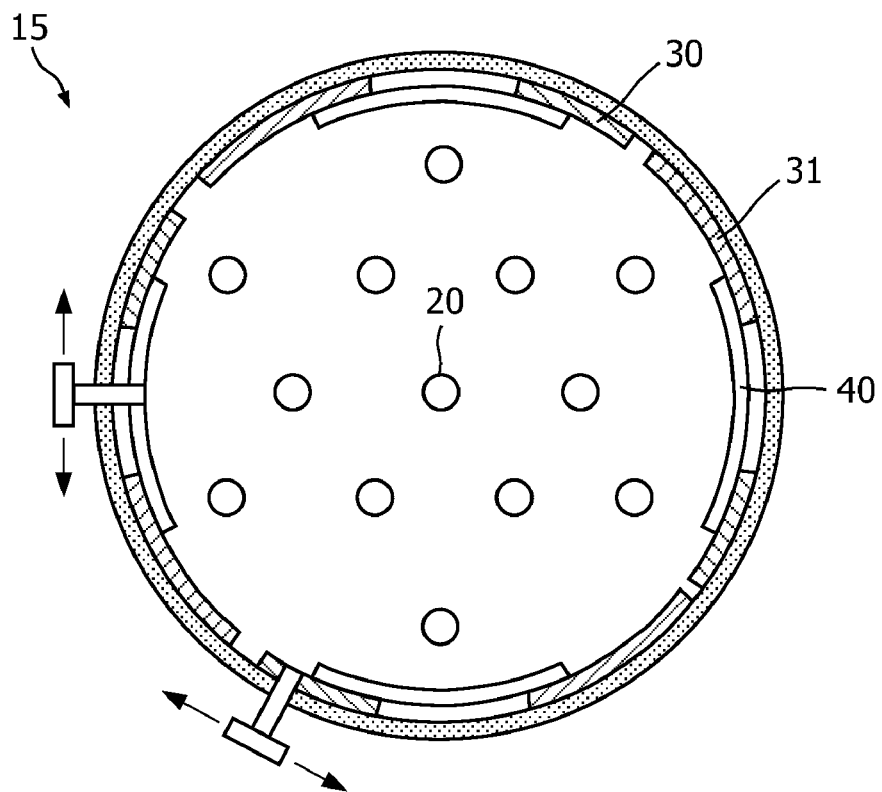

FIGS. 6A and 6B show schematic cross-sectional views of a sixth embodiment of the color-tunable illumination system 15 according to the invention. In this embodiment, the shielding means 40 and/or the first luminescent material 30 are movable within the light mixing chamber 50. By individually moving the shielding means 40 and/or the first luminescent material 30 within the light mixing chamber 50 the contribution of the light emitted by the first luminescent material 30 may be tuned, thus tuning the color of the light emitted by the color-tunable illumination system 15. In the embodiment shown in FIGS. 6A and 6B the moving of the shielding means 40 and/or of the first luminescent material 30 is achieved by rotational movement along the periphery of the light mixing chamber 50. The third luminescent material 31 may additionally also be movable within the light mixing chamber 50 to further enhance the tunability of the color of the light emitted by the color-tunable illumination system 15. The color-tunable illumination system 15 may further comprise the further luminescent material 32 and a diffuser 58 at the light exit window 52 of the color-tunable illumination system 15. The cross-section shown in FIG. 6A is perpendicular to the cross-section shown in FIG. 6B.

Figure 7A:
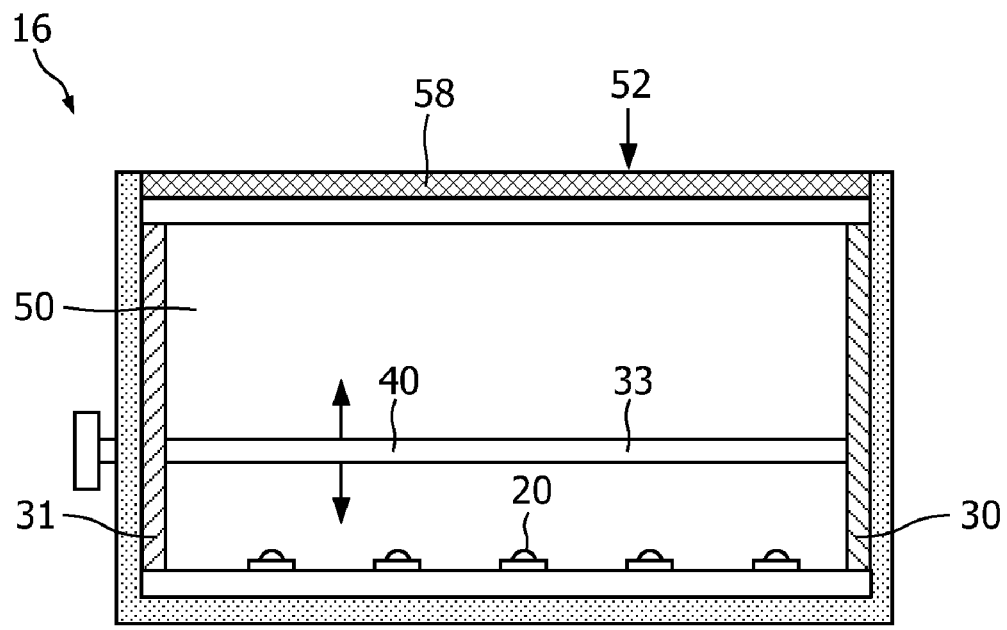
FIGS. 7A, 7B and 7C show schematic cross-sectional views of a seventh embodiment of the color-tunable illumination system according to the invention.
Figures 7B, 7C:
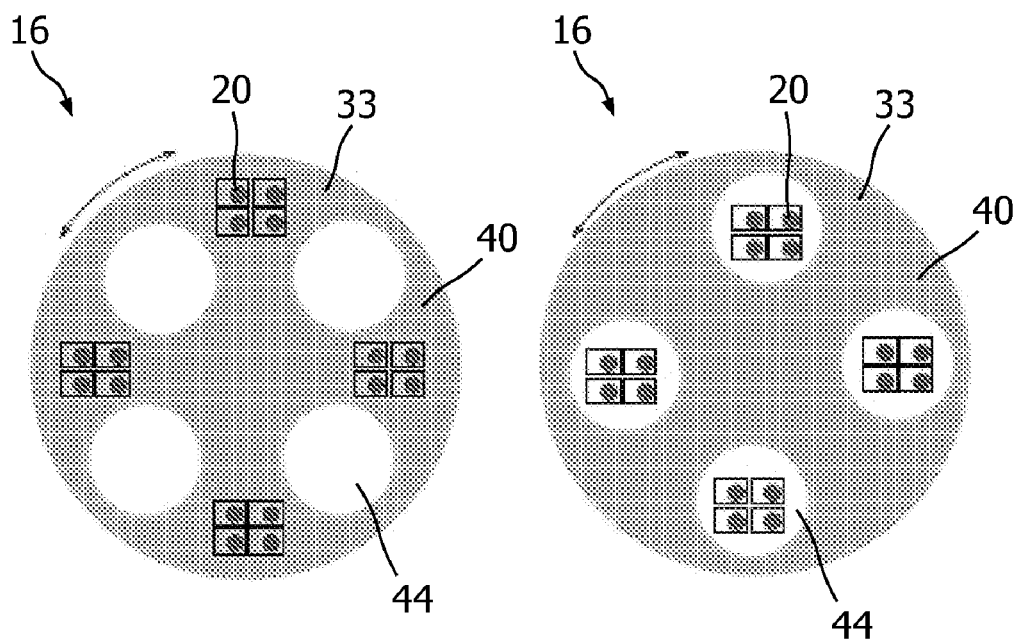

FIGS. 7A, 7B and 7C show schematic cross-sectional views of a seventh embodiment of the color-tunable illumination system 16 according to the invention. In the embodiment shown in FIGS. 7A, 7B and 7C again a moving shielding means 40 is arranged inside the light mixing chamber 50. In the embodiment shown in FIG. 7A the shielding means 40 is movable in a direction perpendicular to the bottom wall 56 away from the light source 20 while in the embodiments shown in FIGS. 7B and 7C the shielding means 40 are indicated to rotate within the light mixing chamber 50 (FIGS. 7B and 7C are a top-view of the seventh embodiment). In this seventh embodiment the light emitted by the light source 20 is at least partially shielded from the first luminescent material 30 by converting part of the light emitted by the light source 20 into light of the third predefined color R via the second luminescent material 33 of the shielding means 40. Because the first luminescent material 30 is unable to convert light of the third predefined color R into light of the second predefined color Y, less light of the second predefined color Y is emitted by the first luminescent material 30, thus altering the color of the light emitted by the color-tunable illumination system 16.

In the embodiment shown in FIG. 7A the shielding means 40 moves away from the light source 20 thus exposing more of the first luminescent material 30 to the light of the first predefined color UV, B. As such, by moving the shielding means 40 away from the light source 20, more light of the first predefined color UV, B may be converted by the first luminescent material 30. By moving the shielding means 40 closer to the light sources 20, a major part of the light of the first predefined color UV, B is converted into light of the third predefined color R via the second luminescent material 33, leaving less light of the first predefined color UV, B to be converted into light of the second predefined color Y.

In the embodiment shown in FIGS. 7B and 7C the shielding means 40 comprises holes 44 through which the light of the first predefined color UV, B may be transmitted. When more light of the first predefined color UV, B is transmitted through the holes 44 (as shown in FIG. 7C), a larger part of the light of the first predefined color UV, B will impinge on the first luminescent material 30 arranged at the wall of the light mixing chamber 50 which alters the color of the light emitted by the color-tunable illumination system 16. Alternatively, when the light source 20 is substantially covered by the shielding means 40 comprising the second luminescent material 33, less light of the first predefined color UV, B will impinge on the first luminescent material 30 as most of the light of the first predefined color UV, B is already converted into light of the third predefined color R. This will change the color of the light emitted by the color-tunable illumination system 16.

Alternatively, the shielding means 40 as shown in FIGS. 7B and 7C may be movable in a direction substantially perpendicular to the bottom wall as indicated in FIG. 7A to alter a contribution of the light of the first predefined color UV, B which impinges on the first luminescent material 30. Further alternatively, the holes 44 do not need to be round as shown in FIGS. 7B and 7C and may have any shape.

Figures 8A, 8B:
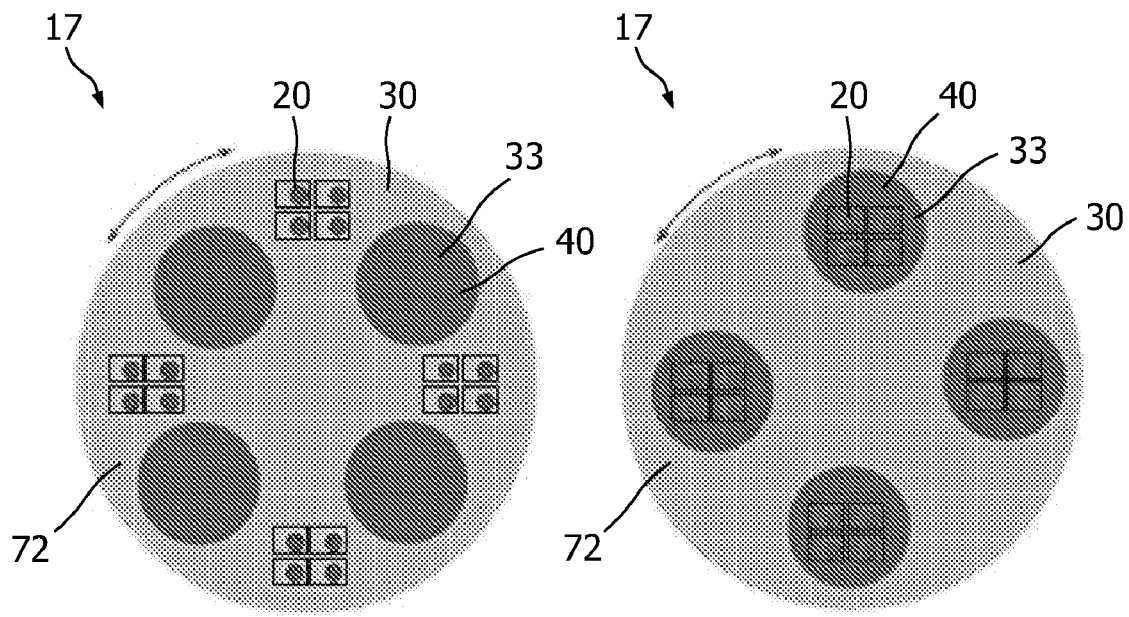
FIGS. 8A and 8B show schematic cross-sectional views of an eighth embodiment of the color-tunable illumination system according to the invention.

FIGS. 8A and 8B show schematic cross-sectional views of an eighth embodiment of the color-tunable illumination system 17 according to the invention. In the embodiment shown in FIGS. 8A and 8B again a top-view of the color-tunable illumination system 17 is shown in which the sheet 72 is a movable disc 72 arranged inside the light mixing chamber 50 (not shown) in which the shielding means 40 is arranged on the sheet 72, such that when the sheet 72 rotates the shielding means 40 may be arranged between the sheet 72 and the light source 20. Again, the shielding of at least part of the light emitted by the light source 20 is obtained by converting part of the light of the first predefined color UV, B by the second luminescent material 33 present in or on the shielding means 40 into light of the third predefined color R. Because the first luminescent material 30 is unable to convert the light of the third predefined color R into light of the second predefined color Y, the rotation of the sheet 72 such that the shielding means 40 is arranged between the first luminescent material 30 and the light source 20 alters the color of the light emitted by the color-tunable illumination system 17 according to the invention.

In the situation shown in FIG. 8A the light source 20 emits the light via the sheet 72 comprising the first luminescent material 30 and thus the light emitted by the color-tunable illumination system 17 comprises light of the second predefined color Y. In the situation shown in FIG. 8B, the light source 20 emits light via the shielding means 40 comprising the second luminescent material 33. In the situation shown in FIG. 8B the contribution of the light of the second predefined color Y will be considerably less compared to the situation shown in FIG. 8A, thus altering the color of the light emitted by the color-tunable illumination system 17.

Figure 9:
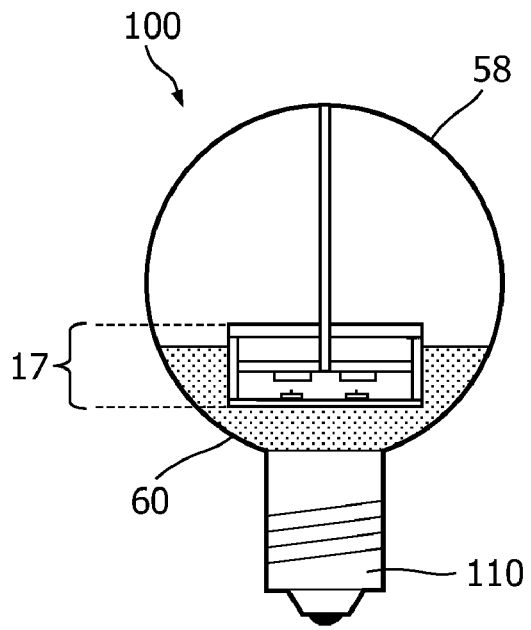
FIG. 9 shows a schematic cross-sectional view of a lamp according to the invention.

FIG. 9 shows a schematic cross-sectional view of a lamp 100 according to the invention. The lamp 100 shown in FIG. 9 comprises the color-tunable illumination system 17 as shown in FIGS. 8A and 8B. The lamp 100 comprises cooling means 60 for cooling the light emitting diodes 20 or the laser diodes 20 of the color-tunable illumination system 17. Furthermore, the lamp 100 comprises means 110 for retro-fitting the lamp 100 in existing lamp-holders (not shown). The lamp 100 also comprises rotating means for rotating the sheet 72 (see FIG. 8A) and the light sources 20 with respect to each other to alter a color of the light emitted by the lamp 100. This rotating of the sheet 72 and the light sources 20 with respect to each other may be done manually or using, for example, a motor.

The color-tunable illumination system 10, 11, 12, 13, 14, 15, 16, 17 as disclosed in the previous FIGS. 1 to 9 may also be used for correcting for color-differences in the light emitted by the light source 20 in a color-tunable illumination system 10, 11, 12, 13, 14, 15, 16, 17. To correct for color-difference in the light source 20, the light source 20, the first luminescent material 30 and/or the shielding means 40; 42 are changed for generating the second situation in which a color of the light emitted from the color-tunable illumination system 10, 11, 12, 13, 14, 15, 16, 17, in operation, in the second situation, substantially corresponds to a predetermined color. In such a way deviations of the color emitted by the light source 20 may be corrected, for example, in the factory before the color-tunable illumination system 10, 11, 12, 13, 14, 15, 16, 17 is sold. As such, light sources which are from different bins which emit light having a different color, may thus be corrected.

It should be noted that the above-mentioned embodiments illustrate rather than limit the invention, and that those skilled in the art will be able to design many alternative embodiments without departing from the scope of the appended claims.

In the examples shown, the colors red, blue, yellow and amber are mainly used. However, it is immediately clear to a person skilled in the art that using the color-tunable illumination system according to the invention substantially any color may be mixed such that substantially light of any color may be emitted from the color-tunable illumination system. Furthermore, in the examples shown, the mechanical shielding means are moved with respect to the luminescent material. However, it is immediately clear to a person skilled in the art that instead of the manual moving of the shielding means, the luminescent material and/or the light sources to expose the luminescent material, the moving of the shielding means, the luminescent material and/or the light sources may be done using other well known displacement techniques, such as using motors.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A color-tunable illumination system comprising a light source, a first luminescent material, and shielding means,
    the light source emitting light of a first predefined color (B; UV),
    the first luminescent material being arranged for converting light of the first predefined color (B; UV) into light of a second predefined color (A; B; Y) different from the first predefined color (B; UV), and
    the shielding means being arranged for preventing at least part of the light emitted by the light source to impinge on the first luminescent material at least one of, the light source, the first luminescent material or the shielding means being changeable from a first situation to a second situation, in the first situation the light source, the first luminescent material and the shielding means being arranged for shielding at least part of the first luminescent material against impinging light of the first predefined color (B; UV) emitted by the light source, and in the second situation the light source, the first luminescent material and the shielding means being arranged for shielding less of the first luminescent material to the light of the first predefined color (B; UV) emitted by the light source compared to the first situation.

2. Color-tunable illumination system as claimed in claim 1, wherein the shielding means being arranged between the light source and the first luminescent material, the shielding means being changeable from a first position to a second position, in the first position the shielding means is arranged for substantially shielding the first luminescent material against impinging light of the first predefined color (B; UV) emitted by the light source, and, in the second position, the shielding means are arranged for exposing at least part of the first luminescent material to the light of the first predefined color (B; UV) emitted by the light source.

3. Color-tunable illumination system as claimed in claim 1, wherein the shielding means, the first luminescent material or the light source are movable with respect to each other between the first position and the second position.

4. Color-tunable illumination system as claimed in claim 1, wherein the shielding means comprises a second luminescent material for converting at least part of the light of the first predefined color (B; UV) into light of a third predefined color (R) different from the first (B; UV) and second (A; B; Y) predefined color, the first luminescent material being unable to convert the light of the third predefined color (R) into light of the second predefined color (A; B; Y).

5. Color-tunable illumination system as claimed in claim 1, wherein the shielding means is arranged for altering a transmission of the light of the first predefined color (B; UV) through the shielding means, the transmission of the light of the first predefined color (B; UV) through the shielding means being different in the first position compared to the second position.

6. Color-tunable illumination system as claimed in claim 1, 4 or 5, wherein the color tunable illumination system comprises a further luminescent material being arranged for converting light of the first predefined color (B; UV) into light of a further predefined color (Y; W) different from the first predefined color (B; UV) and the second predefined color (A; B; Y).

7. Color-tunable illumination system as claimed in claim 1, wherein the first luminescent material and the shielding means are arranged inside a light mixing chamber and wherein the light source is arranged for emitting light into the light mixing chamber.

8. Color-tunable illumination system as claimed in claim 7, wherein the shielding means are movable inside the light mixing chamber, or wherein the shielding means are movable into or out of the light mixing chamber.

9. Color-tunable illumination system as claimed in claim 7, wherein the first luminescent material is movable inside the light mixing chamber, or wherein the first luminescent material is movable into or out of the light mixing chamber.

10. Color-tunable illumination system as claimed in claim 7, wherein the light mixing chamber comprises the further luminescent material, and wherein at least part of a surface (44) of the shielding means facing the light source comprises the further luminescent material.

11. Color-tunable illumination system as claimed in claim 1, wherein the first luminescent material, the second luminescent material or the further luminescent material comprises a mixture of phosphor materials, wherein the mixture of phosphor materials in the first luminescent material is different from the mixture of the phosphor materials in the second and/or the further luminescent material.

12. Color-tunable illumination system as claimed in claim 5, wherein the first predefined color (B) is the color blue, the luminescent material converts the absorbed light of the first predefined color (B) into amber light being the second predefined color (A), and the second and/or further luminescent material convert the absorbed light of the first predefined color (B) into yellow light being the further predefined color (Y).

* * * * *